United States Patent [19]

Middleton et al.

[11] 4,135,394

[45] Jan. 23, 1979

[54] WAVE MEASURING BUOY

[76] Inventors: Foster H. Middleton, Curtis Corner Rd., Peace Dale, R.I. 02879; Lester R. LeBlanc, 80 Highland Ave., Narragansett, R.I. 02882

[21] Appl. No.: 791,181

[22] Filed: Apr. 27, 1977

[51] Int. Cl.² .............................................. G01P 15/00
[52] U.S. Cl. ............................................... 73/170 A
[58] Field of Search ................................... 73/170 A

[56] References Cited

U.S. PATENT DOCUMENTS

| | | | |
|---|---|---|---|
| 3,301,048 | 1/1967 | Felsenthal, Jr. et al. | 73/170 A |
| 3,769,838 | 11/1973 | Buckler | 73/170 A |

FOREIGN PATENT DOCUMENTS

| | | | |
|---|---|---|---|
| 1249035 | 10/1971 | United Kingdom | 73/170 A |
| 1304165 | 1/1973 | United Kingdom | 73/170 A |

Primary Examiner—Charles A. Ruehl
Attorney, Agent, or Firm—A. W. Breiner; Albert P. Davis

[57] ABSTRACT

A wave measuring buoy for measuring ocean surface wave amplitude and frequency is disclosed. The buoy includes a single-axis accelerometer suspended as a pendulum inside a water-proof housing. The water-proof housing is connected to and beneath the flotation hull of the buoy and is located at the center of rotation of the buoy assembly so that the accelerometer is substantially insensitive to roll and pitch motions of the buoy. The output of the accelerometer is an analog signal proportional to the vertical (heave) acceleration of the buoy. A frequency transfer calibration can be applied to the accelerometer output to compensate for the mass, size and resonant heave behavior of the buoy.

6 Claims, 3 Drawing Figures

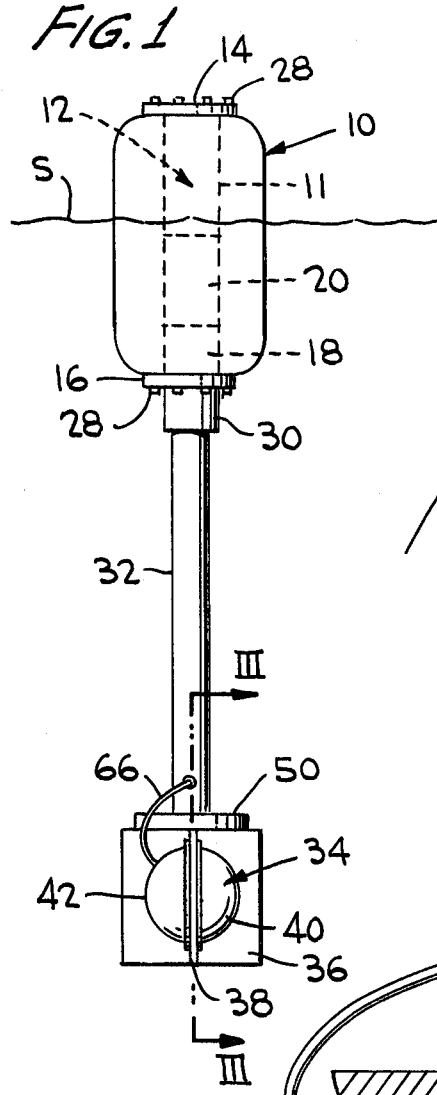
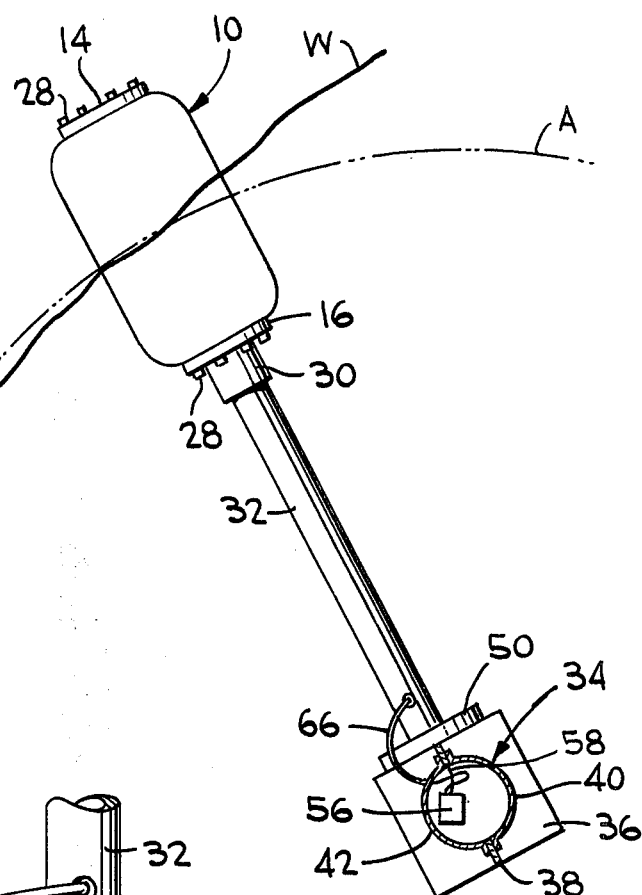
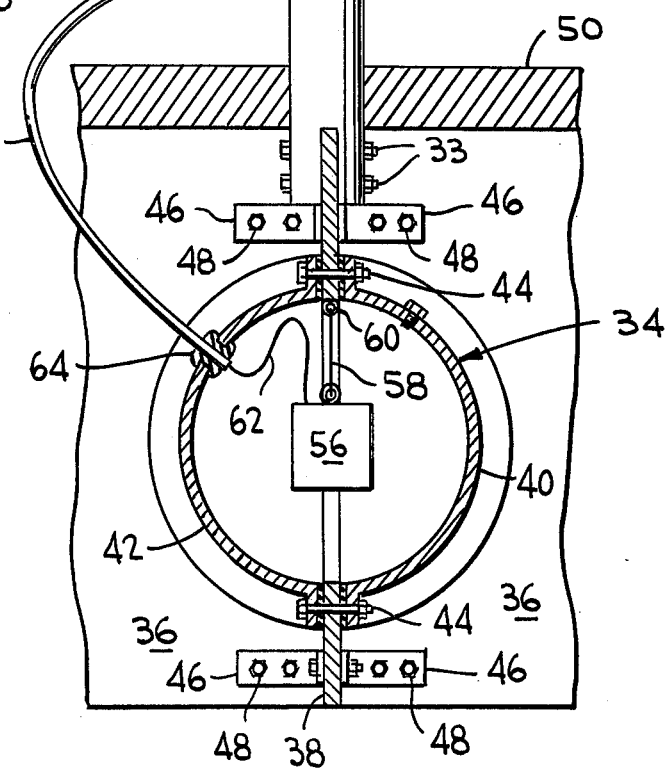

WAVE MEASURING BUOY

BACKGROUND OF THE INVENTION

In many marine operations and studies, it is necessary to have accurate data relative to wave height and frequency. In relatively shallow water such data may be obtained by attaching measuring instruments to fixed structures, such as bridge abutments, piers, piles, etc. Wave measurement in deeper water where no fixed instrument support is available has employed buoys to support the measuring instruments. Two general types of buoys have been employed. The first type is a very long thin spar buoy adapted to float vertically. Such a buoy is relatively stable and provides a good support for measuring instruments. However, such spar buoys are difficult to launch and retrieve due to their great length and small diameter and such launch and retrieve cannot be accomplished from a small boat. The second type of buoy employed is more compact and can be launched and retrieved from a small boat. Such buoys tend to follow the wave surface and are equipped with instruments, such as an accelerometer to measure the vertical movement of the buoy. However, such buoys pitch and roll and this motion results in inaccurate data. Attempts to reduce or eliminate the effect of roll and pitch have been incorporated in some of the prior art wave measuring buoys. U.S. Pat. No. 3,769,838 discloses an electronic circuit intended to remove that energy in an accelerometer signal caused by the tilt of the accelerometer. Many times this will remove real wave data. Another prior art wave measuring buoy has maintained an accelerometer in a vertical position by means of a gyroscope so that it will measure only vertical accleration. This device is effective but is extremely expensive.

SUMMARY OF THE INVENTION

The present invention provides a wave measuring buoy which employs a single-axis accelerometer mounted as a pendulum in a water-proof housing. Said water-proof housing is secured to and beneath the flotation hull of the buoy so that said buoy assembly rotates around said housing with the housing at the center of rotation thereof. As a result, the accelerometer is always in a substantially vertical position and is, therefore, substantially uneffected by buoy roll and pitch. Thus the accelerometer signal is generated only by vertical motion and gives a signal representing the vertical movement of the buoy. Often this information is all that is required. If the actual wave displacement is required, the signal from the accelerometer needs only to be corrected for the mass, size and resonant heave behavior of the buoy.

OBJECTS OF THE INVENTION

It is an object of the invention to provide a wave measuring buoy wherein substantially all of data produced thereby is generated by the vertical acceleration of the buoy.

Another object of the invention is to provide a wave measuring buoy wherein a single-axis accelerometer is mounted as a pendulum at the center of rotation of said buoy.

Yet another object of the invention is to provide an accurate and inexpensive wave measuring buoy employing a single-axis accelerometer.

Other objects will become apparent from the following specification and claims.

BRIEF DESCRIPTION OF THE DRAWINGS

FIG. 1 is a side elevation of the wave measuring buoy in calm water.

FIG. 2 is a view similar to FIG. 1 but showing the buoy reacting to a wave and also showing the water-proof accelerometer housing in section to show the vertical position of said accelerometer.

FIG. 3 is a fragmentary sectional view of the water-proof accelerometer housing taken on the line III—III of FIG. 1.

DESCRIPTION OF THE PREFERRED EMBODIMENT

The wave measuring buoy assembly comprises a flotation hull 10 preferably formed of a durable plastic and filled with a solidified plastic foam. An axial opening 11 extends from the top of hull 10 to its bottom and which together with top plate 14 and bottom plate 16 forms a water-proof compartment 12 which contains a battery 18, and an electronic recorder or a telemetering unit 20. Top and bottom plates 14 and 16 are secured to hull 10 by bolts 28 which engage threaded openings in hull 10, bottom plate 16 has a sleeve 30 secured to its lower surface. A length of pipe 32 fits within and is fixedly secured to sleeve 30.

A water-proof housing 34 and associated stabilizing fins 36 and 38 are fixed to the lower end of pipe 32. Water-proof housing 34 is formed from two flanged hemispheres 40 and 42 which are fastened together, with fin 38 therebetween, by bolts 44. The area of fin 38 inside said hemispheres is cut out to thereby provide a spherical cavity.

The lower end of pipe 32 is bifurcated and extends over the midpoint of fin 38 and is secured to said fin 38 by bolts 33. A pair of fins 36, each having a semi-circular opening in one edge are secured to fin 38, with their semi-circular opening adjacent water-proof housing 34, by means of brackets 46 and bolts 48. An annular weight 50 surrounds pipe 32 and rests on fins 36 and 38.

A single-axis accelerometer 56 is suspended in housing 34 by flexible strand 58 so as to be substantially in the center of said housing 34 when pipe 32 is vertical. Strand 58 can be any suitable material, such as fine nylon monofilament, which will permit accelerometer 56 to swing as a pendulum and to remain vertical as housing 34 pivots. The upper end of strand 58 is secured to an eye 60 formed on fin 38 and the lower end is secured to accelerometer 56. A flexible electrical lead 62 from accelerometer 56 passes through a water-proof seal 64 in hemisphere 42 and then through a protective sheath 66 into the lower end of pipe 32. Lead 62 extends upwardly in pipe 32 and passes through another water-proof seal (not shown) in bottom plate 16 and into water-proof compartment 12. Housing 34 is filled with a suitable damping fluid. The total weight of the wave measuring buoy is such that it floats on the surface of calm water in a vertical position with the surface of the water S at approximately the mid-point of hull 10.

Ideally, an accelerometer buoy is infinitesimally small, has no mass, and does not roll or pitch when riding on the wavey surface of the sea. Under such ideal conditions, a single-axis accelerometer detects the pure vertical acceleration of the buoy. For this ideal tiny "cork" situation, it is only necessary to doubly integrate the acceleration signal to produce the buoy displacement function. In this ideal massless case, there is no difference between the vertical displacement of the buoy and the vertical displacement of the wave surface. In the practical, real situation, the buoy must have finite size and it must have some mass. It will therefore have a resonant behavior of its own which depends upon the mass of the assembly, the size of the assembly, and the shape of the buoy body.

In the buoy assembly of the present invention there are two distinct pendulous motions. The first is the buoy assembly itself. The horizontal drag of fins 36, 38 and water-proof housing 34 is much higher than the horizontal dray of the flotation hull 10. As a result when the buoy assembly tends to either roll or pitch, it stabilizes itself by acting like an inverted pendulum wherein the center of roll or pitch rotation is waterproof housing 34 which contains accelerometer 56. FIG. 2 illustrates the manner in which flotation hull 10 swings on arc A around water-proof housing 34 as it reacts to wave W. The buoy assembly is preferably so proportioned that its roll movement period is at least two seconds. The second pendulous motion is in the accelerometer suspension in the waterproof housing 34. This movement period preferably is no longer than 0.07 second.

It will be seen that as the buoy assembly reacts to wave motion the short period of the accelerometer pendulum will permit the accelerometer to quickly align itself with the vertical and therefore gain an insensitivity to roll and pitch. Thus the signal produced by accelerometer 56 will be due only to vertical acceleration.

A wave measuring buoy assembly having the following dimensions has movement periods as described above:

Flotation hull 10 — diameter 18 inches, height 24 inches
  Stabilizing fins 36 — 1 sq. ft. each — ¼ inch plate
  Stabilizing fin 38 — 2 sq. ft. — ¼ inch plate
  Inner diameter of housing 34 — 7 inches
  Length of accelerometer pendulum — 2 inches
  Distance water-line to center of housing 34 — 6 feet
  Weight 50 — 20 pounds
  Pipe 32 — 1½ inch diameter iron pipe
  Total weight of buoy assembly — about 85 pounds It will be clear from the above that the signal produced by accelerometer 56 will be produced only by the vertical movement of the wave buoy assembly. Double integration of that accelerometer signal will give the measurement of the buoy vertical displacement. In many instances such a figure is all that is required. This is especially so if the waves being measured are of considerable height and of a relatively long period. However, the buoy assembly has considerable mass and size and therefore does not follow the movement of a smaller wave as an infinitesimally small no mass buoy would. A correction or transfer function can be applied to the accelerometer signal to correct or calibrate that signal for the difference between the actual buoy assembly movement and the movement of a theoretical weightless accelerometer buoy. Such a transfer function is obtained by comparing the movement of the wave measuring buoy assembly with the actual displacement of the wave which caused such buoy movement. That wave displacement is determined by a wave measuring instrument fixed to a motionless structure. The transfer function thus obtained is a function which is applied to the accelerometer signal and the result is double integrated to give the true displacement of the wave.

The signal from the accelerometer can be handled in several different manners. For example, the accelerometer signal can be recorded on a tape recorder carried in the water-proof compartment 12. The recorded signals from the accelerometer thus obtained can be played into a computer which will apply the transfer function to the signals and double integrate the result to give the wave displacement. Alternatively telemetering equipment can be substituted in compartment 12 for the tape recorder. Such telemetering equipment to transmit the accelerometer signal to a shore, water or air based station. The signal thus transmitted can either be recorded and the recording played into a computer as above described or the transmitted signal can be fed directly to the computer.

It is believed that in the light of the above teaching the actual steps of computing the transfer function and of using that function to correct the accelerometer signal are within the skill of technicians working in the art. However, a detailed description of the manner in which such a transfer function can be determined and applied against an accelerometer signal is contained in paper number OTC 2597 entitled, "Spectral Tuning and Calibration of a Wave Follower Buoy" presented at the Eighth Annual Offshore Technology Conference, Houston, Texas, May 3-6, 1976.

It will be apparent to those skilled in the art that various changes and modifications may be made in the construction and arrangement of parts as illustrated and described without departing from the spirit of the invention, and it is intended that all such changes and modifications shall be embraced within the scope of the following claims.

What is claimed is:

1. A wave measuring buoy assembly capable of being launched and retrieved from a small boat and which when launched tends to follow the wave surface and in the course of following a wave surface tends to pitch and roll, said assembly comprising a flotation hull and a rigid underwater assembly depending therefrom, said underwater assembly having a greater horizontal drag than said hull, said underwater assembly comprising a water-proof housing and means fixing said housing to said hull and spaced therebelow, said hull being adapted to support said underwater assembly therebeneath in a body of water, said housing being spaced below said flotation hull a distance such that as the buoy assembly rolls or pitches under the influence of wave motion it stabilizes itself by acting as an inverted pendulum, the center of rotation of which is said housing, an accelerometer suspended in said housing for pivotal motion relative thereto, and means to process the output of said accelerometer.

2. A wave measuring buoy as set forth in claim 1 wherein said accelerometer is a single-axis accelerometer.

3. A wave measuring buoy as set forth in claim 2 wherein said accelerometer is suspended as a pendulum whereby it remains substantially vertical as said buoy assembly rotates around said housing.

4. A wave measuring buoy as set forth in claim 3 wherein said housing contains a damping fluid.

5. A wave measuring buoy as set forth in claim 4 wherein said underwater assembly includes a stabilizing fin.

6. A wave measuring buoy as set forth in claim 4 wherein the movement period of the accelerometer pendulum is no longer than 0.07 second.

* * * * *